US012630963B2

(12) United States Patent
Braz et al.

(10) Patent No.: US 12,630,963 B2
(45) Date of Patent: May 19, 2026

(54) FLUID TREATMENT MODULE FOR AN APPLIANCE THAT INCLUDES A MICROFIBER FILTER ACCESS MECHANISM

(71) Applicant: WHIRLPOOL CORPORATION, Benton Harbor, MI (US)

(72) Inventors: Adélcio Braz, Sao Paulo (BR); Tibor Budický, Poprad (SK); Bruno T. Ramasco, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 270 days.

(21) Appl. No.: 18/456,579

(22) Filed: Aug. 28, 2023

(65) Prior Publication Data

US 2025/0075404 A1 Mar. 6, 2025

(51) Int. Cl.
| | |
|---|---|
| *D06F 39/10* | (2006.01) |
| *B01D 29/96* | (2006.01) |
| *B01D 35/30* | (2006.01) |
| *D06F 39/02* | (2006.01) |
| *D06F 39/08* | (2006.01) |
| *D06F 58/20* | (2006.01) |

(52) U.S. Cl.
CPC ............. *D06F 39/10* (2013.01); *B01D 29/96* (2013.01); *B01D 35/30* (2013.01); *D06F 39/02* (2013.01); *D06F 39/083* (2013.01); *D06F 58/203* (2013.01)

(58) Field of Classification Search
CPC ........ D06F 39/02; D06F 39/10; D06F 39/083; B01D 29/96; B01D 35/30
See application file for complete search history.

(56) References Cited

U.S. PATENT DOCUMENTS

| | | | |
|---|---|---|---|
| 8,834,647 | B2 | 9/2014 | Gnadinger et al. |
| 10,760,199 | B2 | 9/2020 | Cannon et al. |
| | | (Continued) | |

FOREIGN PATENT DOCUMENTS

| | | |
|---|---|---|
| CN | 217678200 U | 10/2022 |
| CN | 217869597 U | 11/2022 |
| | (Continued) | |

OTHER PUBLICATIONS

Machine translation of JP-2019201785-A to Morita et al. (Year: 2019).*

(Continued)

*Primary Examiner* — Joseph L. Perrin
(74) *Attorney, Agent, or Firm* — Price Heneveld LLP

(57) ABSTRACT

An appliance includes an outer cabinet that has a treatment interface in communication with a processing space defined within the outer cabinet. A microfiber receptacle is selectively operable relative to the treatment interface of the outer cabinet between an installed position and an extracted position, and defines a sliding interface. A microfiber filter is selectively removable from the microfiber receptacle in the extracted position. A chemistry receptacle is received by the sliding interface, and is selectively operable between a fill position that is at least partially outside of the outer cabinet and a treating position that is within the treatment interface. The chemistry receptacle is operable between the fill position and the treating position when the microfiber receptacle is in the installed position.

20 Claims, 17 Drawing Sheets

(56)                    References Cited

U.S. PATENT DOCUMENTS

| | | | |
|---|---|---|---|
| 11,066,771 B2 | 7/2021 | Zarcone et al. | |
| 11,261,558 B2 | 3/2022 | Eiselt et al. | |
| 2009/0261697 A1* | 10/2009 | Hill | D06F 39/02 |
| | | | 312/333 |
| 2020/0199804 A1 | 6/2020 | Magnusson | |
| 2020/0270795 A1 | 8/2020 | Zarcone et al. | |
| 2024/0110325 A1* | 4/2024 | Mattley | B01D 33/44 |
| 2024/0328065 A1* | 10/2024 | Lee | B01D 46/0006 |
| 2025/0075402 A1* | 3/2025 | Park | D06F 39/02 |

FOREIGN PATENT DOCUMENTS

| | | | | |
|---|---|---|---|---|
| CN | 115637571 A | | 1/2023 | |
| EP | 2678468 B1 | | 8/2015 | |
| EP | 3067458 B1 | * | 9/2018 | D06F 39/02 |
| EP | 3832001 A1 | | 6/2021 | |
| EP | 3983599 A2 | | 4/2022 | |
| EP | 3839128 B1 | | 9/2022 | |
| JP | 2019201785 A | * | 11/2019 | D06F 58/22 |
| WO | 2012114269 A1 | | 8/2012 | |
| WO | 2020251513 A2 | | 12/2020 | |
| WO | 2021068818 A1 | | 4/2021 | |
| WO | 2022075940 A1 | | 4/2022 | |
| WO | 2022115085 A1 | | 6/2022 | |
| WO | 2022118034 A1 | | 6/2022 | |
| WO | 2022237436 A1 | | 11/2022 | |
| WO | WO-2024005372 A1 | * | 1/2024 | D06F 39/12 |

OTHER PUBLICATIONS

Machine translation of WO-2024005372-A1 to Park et al. (Year: 2024).*

* cited by examiner

FLUID TREATMENT MODULE FOR AN APPLIANCE THAT INCLUDES A MICROFIBER FILTER ACCESS MECHANISM

BACKGROUND OF THE DISCLOSURE

The present disclosure generally relates to microfiber filters that are utilized in appliances, and more specifically, to a fluid treatment module for an appliance that includes a microfiber filter access mechanism that can be used for selectively installing and removing a microfiber filter from the appliance.

SUMMARY OF THE DISCLOSURE

According to one aspect of the present disclosure, an appliance includes an outer cabinet that has a treatment interface that is in communication with a processing space defined within the outer cabinet. A microfiber receptacle is selectively operable relative to the treatment interface of the outer cabinet between an installed position and an extracted position. The microfiber receptacle defines a sliding interface. A microfiber filter is selectively removable from the microfiber receptacle in the extracted position. A chemistry receptacle is received by the sliding interface, and is selectively operable along the sliding interface between a fill position that is at least partially outside of the outer cabinet and a treating position that is within the treatment interface. The chemistry receptacle is operable between the fill position and the treating position when the microfiber receptacle is in the installed position, and operation of the microfiber receptacle from the installed position to the extracted position moves the microfiber receptacle and the chemistry receptacle relative to the outer cabinet.

According to another aspect of the present disclosure, a fluid delivery system for an appliance includes a chemistry receptacle that is selectively operable between a treating position within a treatment interface and a fill position that is at least partially removed from the treatment interface. The chemistry receptacle in the treating position is in communication with a processing space. A microfiber filter is selectively disposed within the treatment interface and is operable between an installed position and an extracted position. The microfiber filter in the installed position is in communication with a drain outlet. An actuating mechanism selectively engages the microfiber filter with the chemistry receptacle to define an attached state. The microfiber filter and the chemistry receptacle are removable from the treatment interface in the attached state. The chemistry receptacle is operable independent of the microfiber filter when the actuating mechanism is in an idle state.

According to yet another aspect of the present disclosure, a fluid treatment module for an appliance includes a treatment interface that is configured to be in communication with a fluid delivery system. A microfiber receptacle is selectively operable relative to the treatment interface between an installed position and an extracted position. The microfiber receptacle defines a sliding interface. A microfiber filter is selectively removable from the microfiber receptacle in the extracted position. A chemistry receptacle is received by the sliding interface, and is selectively operable between a fill position that is at least partially outside of the treatment interface and a treating position that is within the treatment interface. An actuating mechanism is coupled to the microfiber receptacle that selectively separates the microfiber receptacle from the installed position. The chemistry receptacle is operable between the fill position and the treating position when the microfiber receptacle is secured in the installed position.

These and other features, advantages, and objects of the present disclosure will be further understood and appreciated by those skilled in the art by reference to the following specification, claims, and appended drawings.

Figure 1:
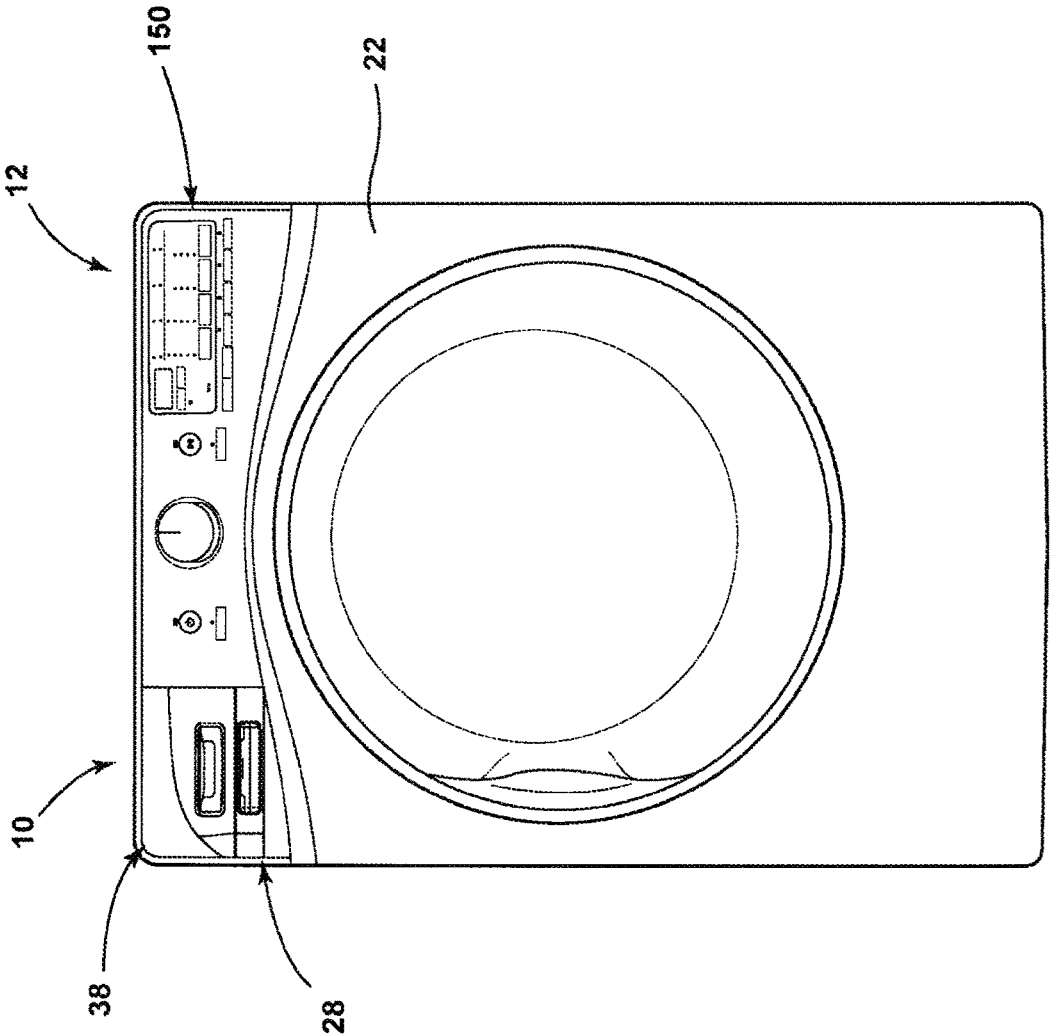
FIG. 1 is a front elevational view of a laundry appliance that includes an aspect of the fluid treatment module.
Figure 2:
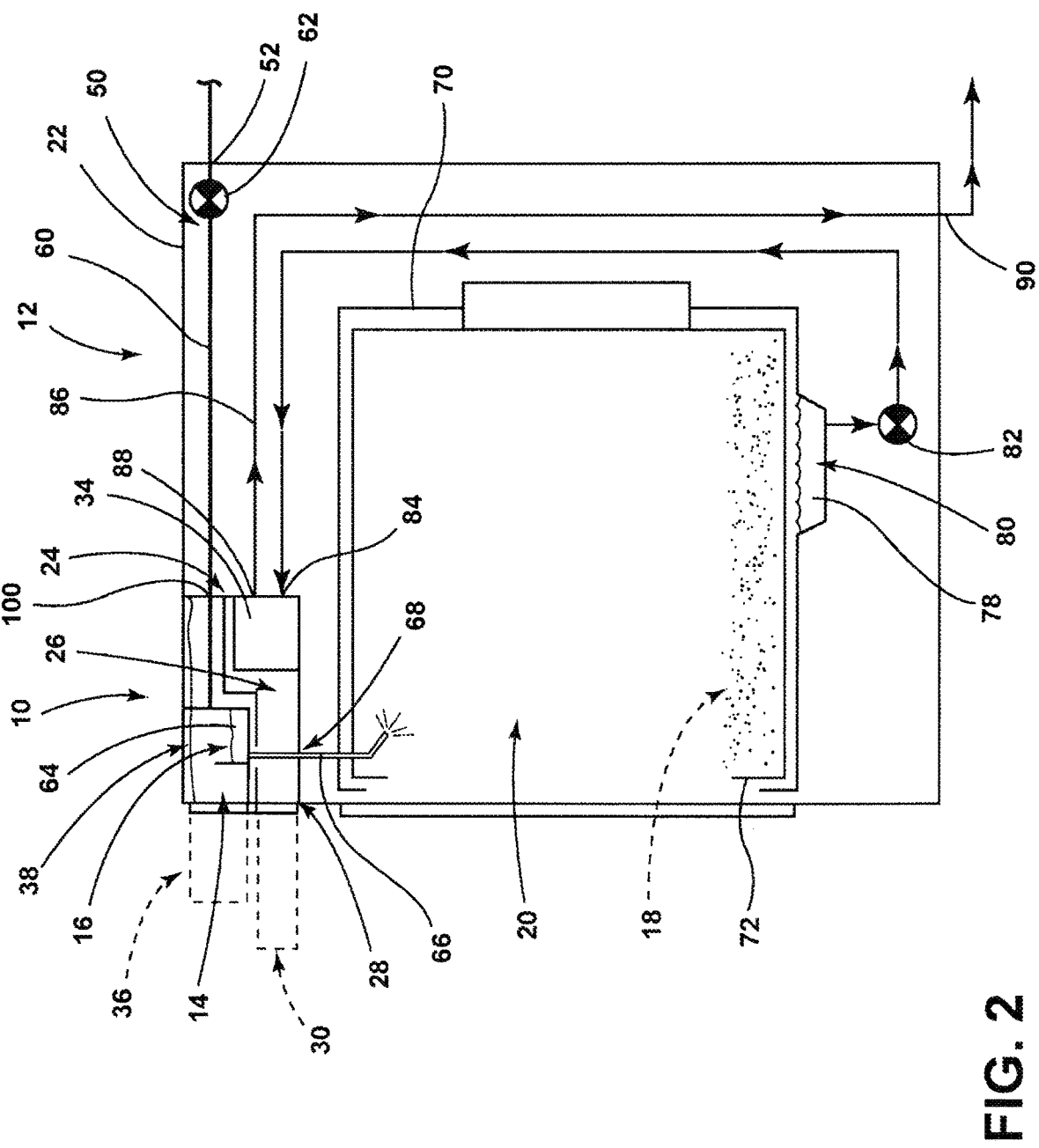
FIG. 2 is a schematic cross-sectional view illustrating interaction between the fluid treatment module and a fluid delivery system for the appliance.
Figure 3:
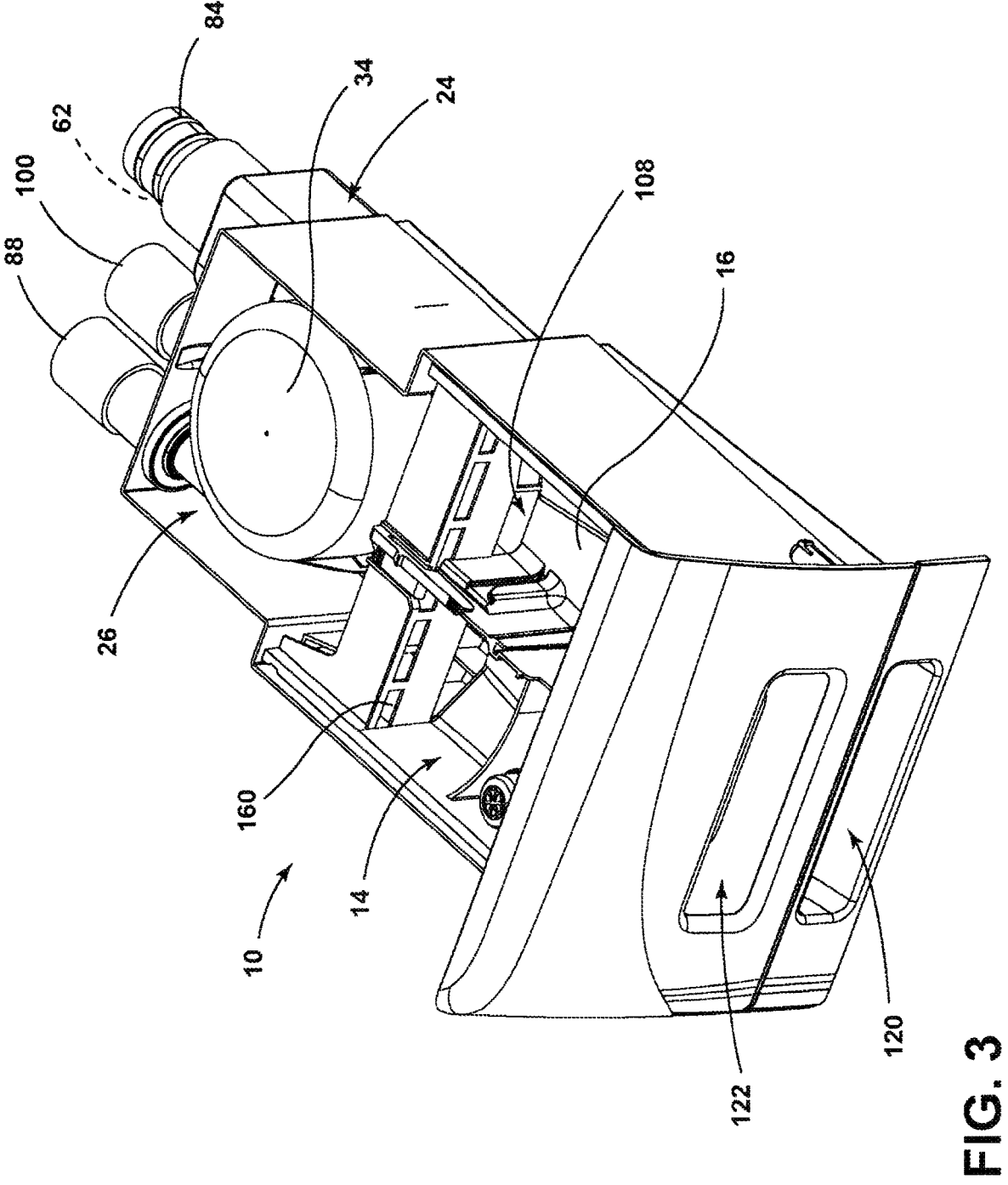
FIG. 3 is a top perspective view of an aspect of the fluid treatment module to be installed within an appliance.
Figure 4:
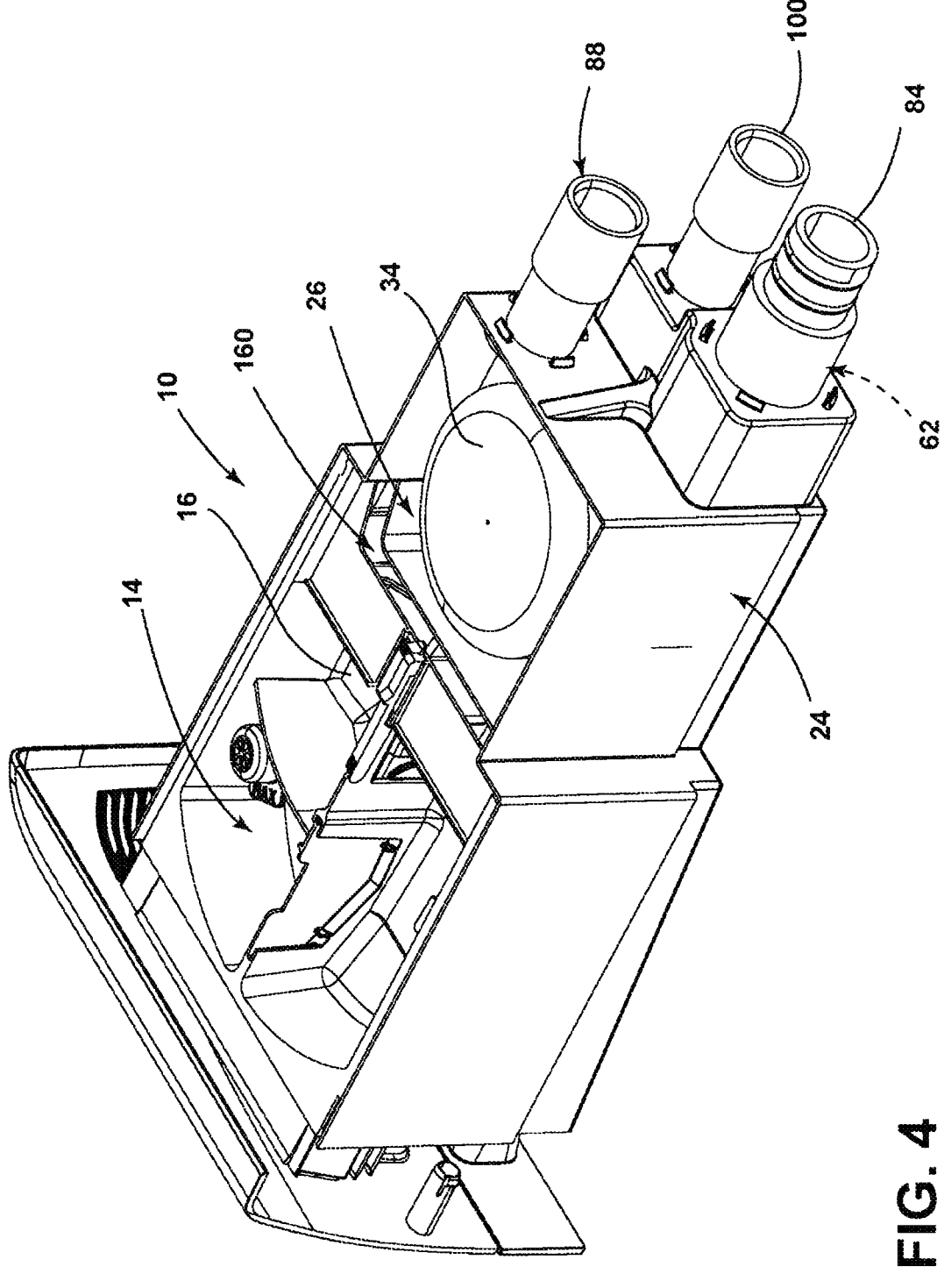
FIG. 4 is another top perspective view of the fluid treatment module of FIG. 3.
Figure 5:
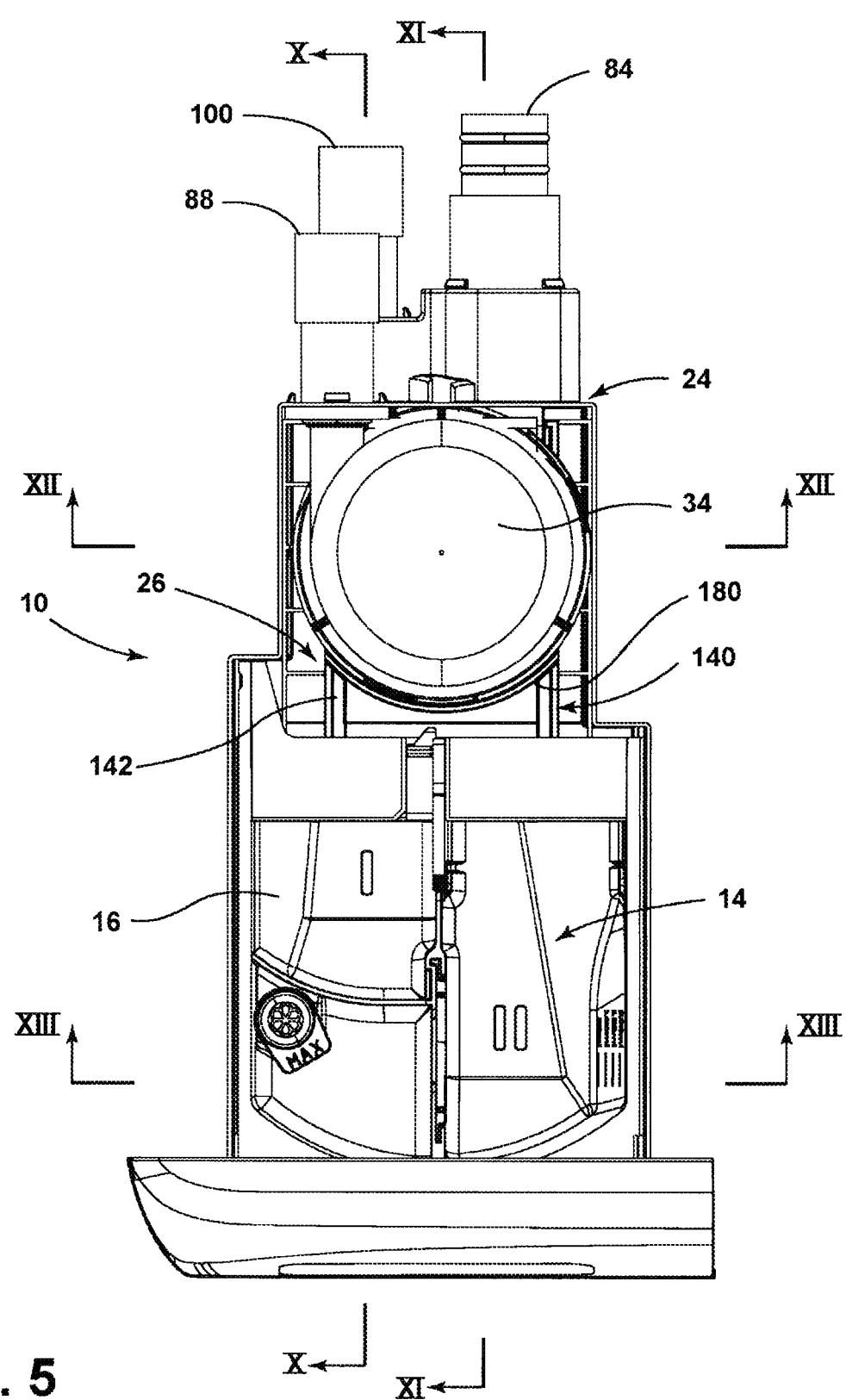
FIG. 5 is a top plan view of the fluid treatment module of FIG. 3.
Figure 6:
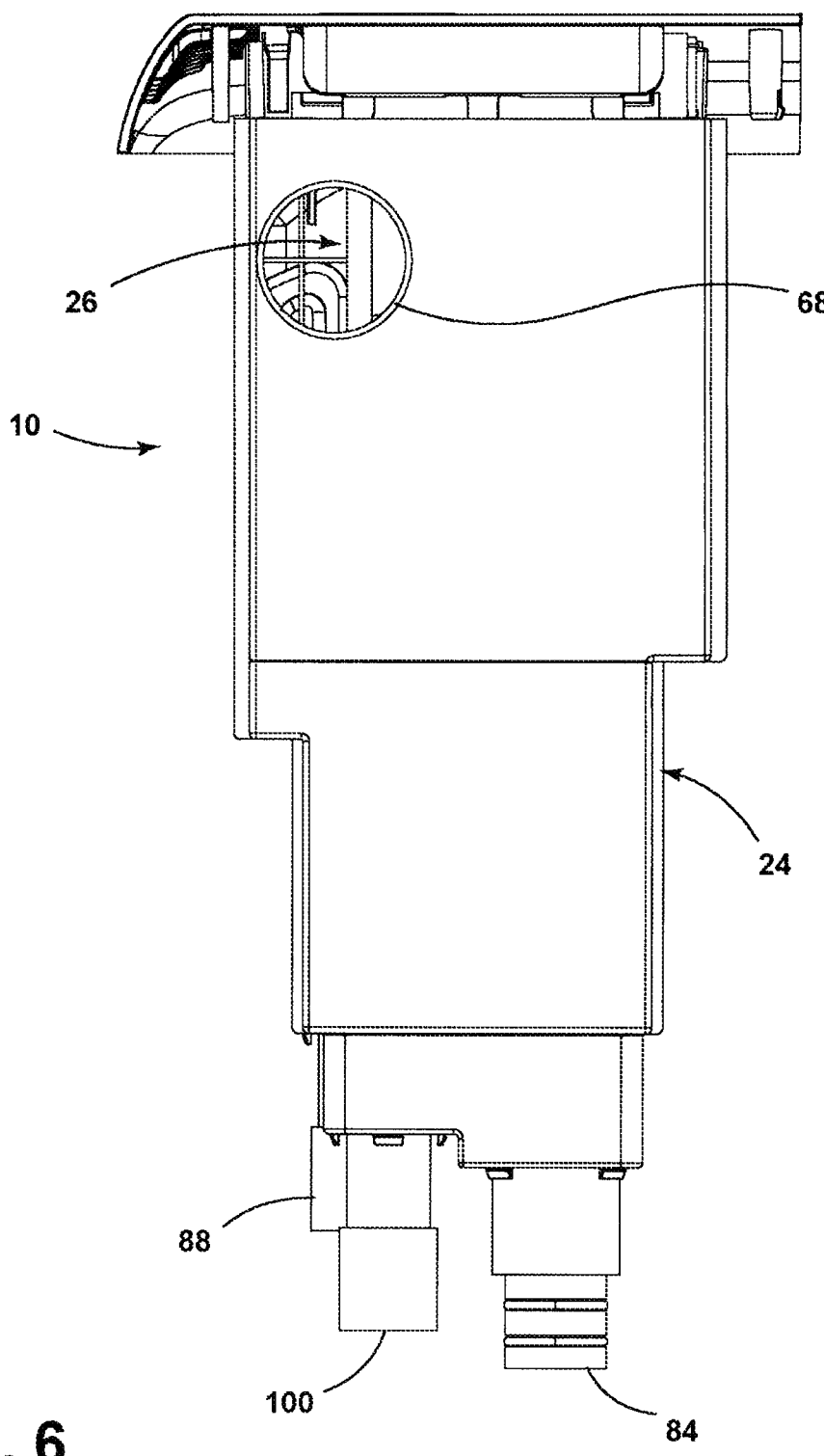
FIG. 6 is a bottom plan view of the fluid treatment module of FIG. 3.
Figure 7:
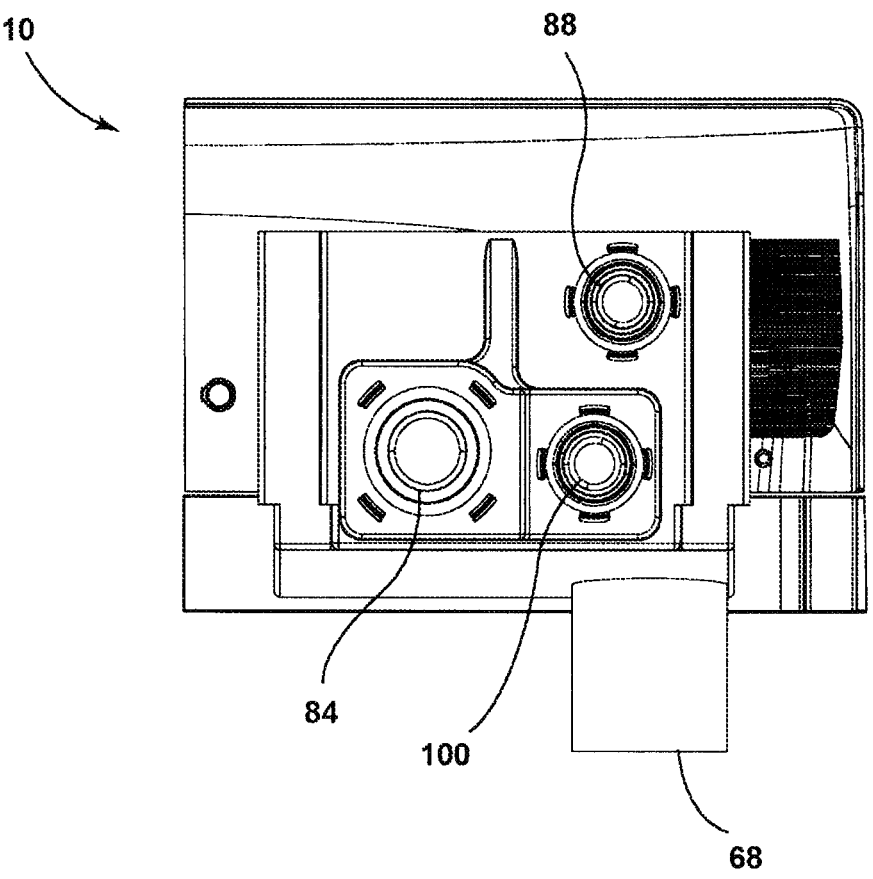
FIG. 7 is a rear elevational view of the fluid treatment module of FIG. 3.
Figure 8:
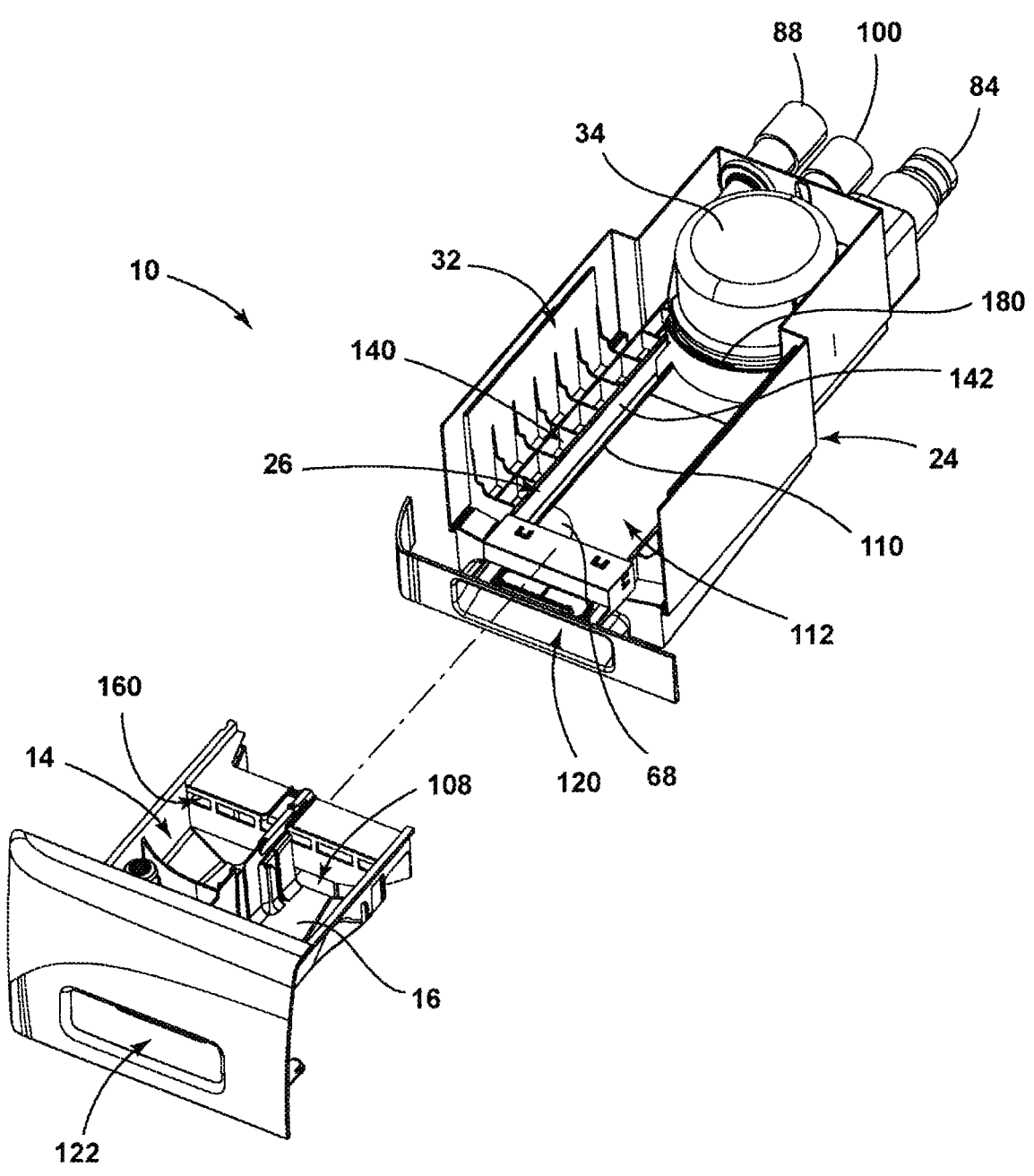
FIG. 8 is a partially exploded perspective view of the fluid treatment module of FIG. 3 and showing the chemistry receptacle separated from the microfiber receptacle.
Figure 9:
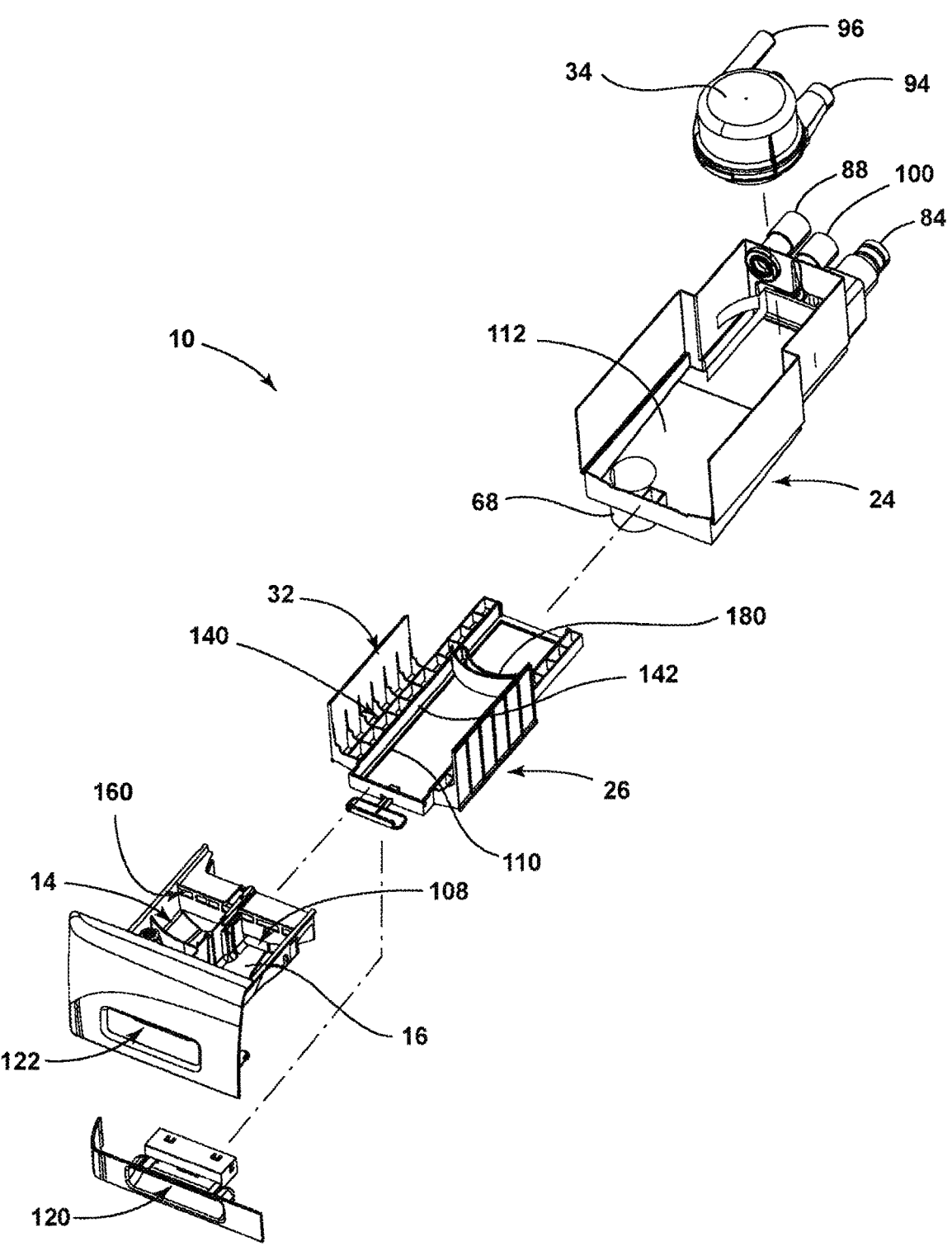
FIG. 9 is an exploded perspective view of the fluid treatment module of FIG. 3.
Figure 10:
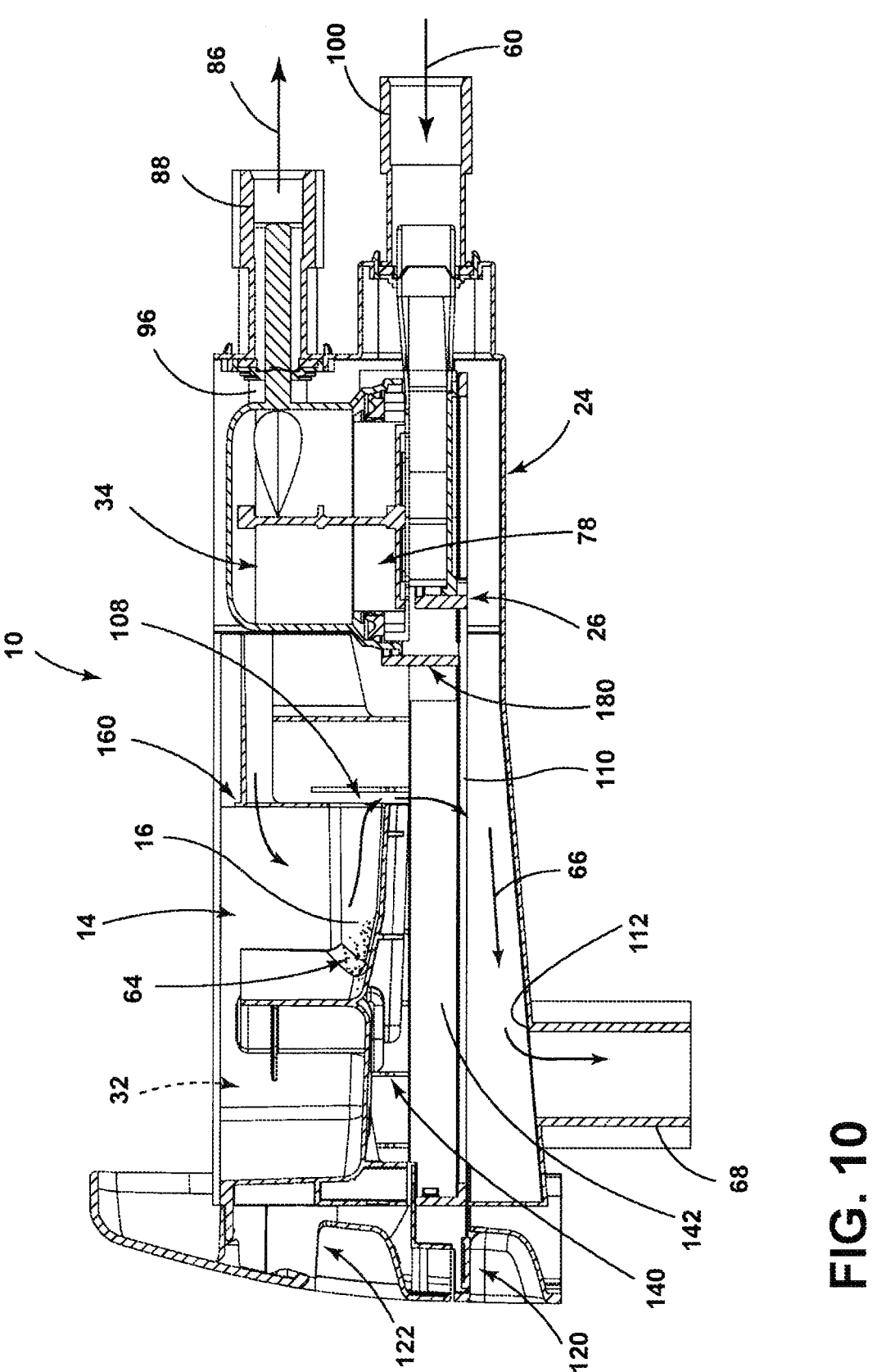
FIG. 10 is a cross-sectional view of the fluid treatment module of FIG. 5 taken along the line X-X.
Figure 11:
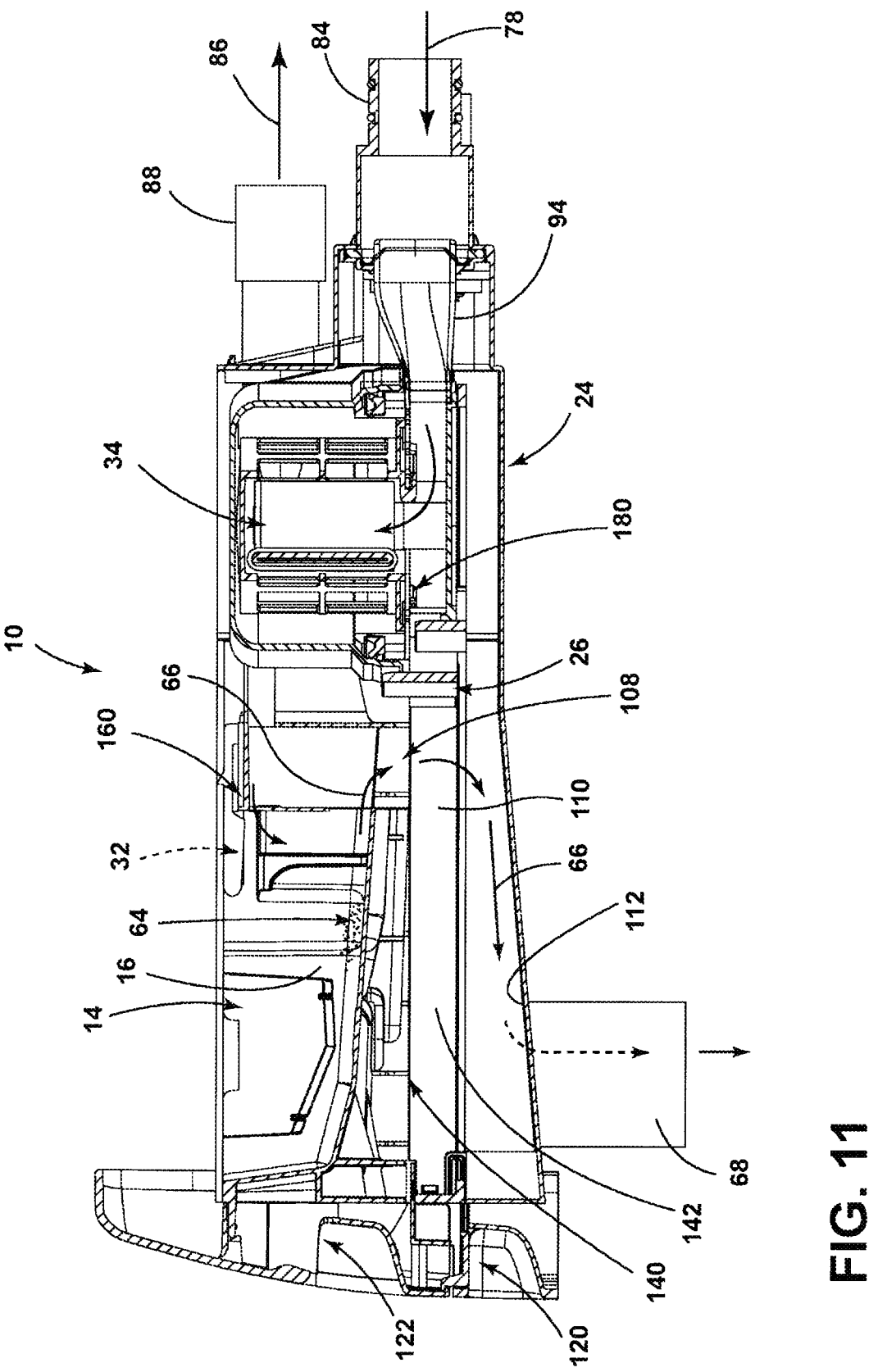
FIG. 11 is a cross-sectional view of the fluid treatment module of FIG. 5 taken along the line XI-XI.
Figure 12:
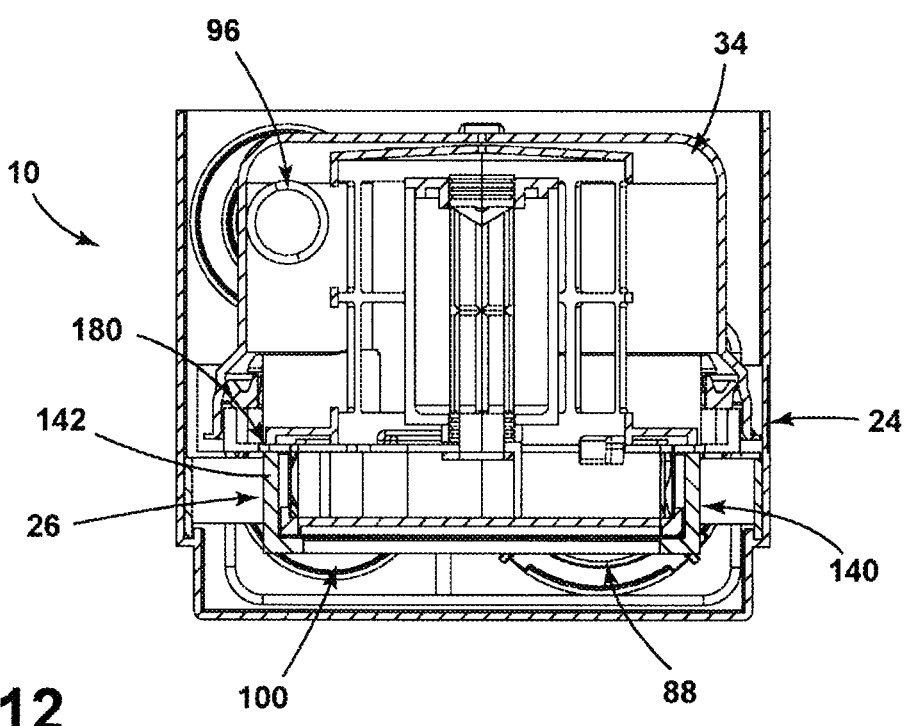
FIG. 12 is a cross-sectional view of the fluid treatment module of FIG. 5 taken along the line XII-XII.
Figure 13:
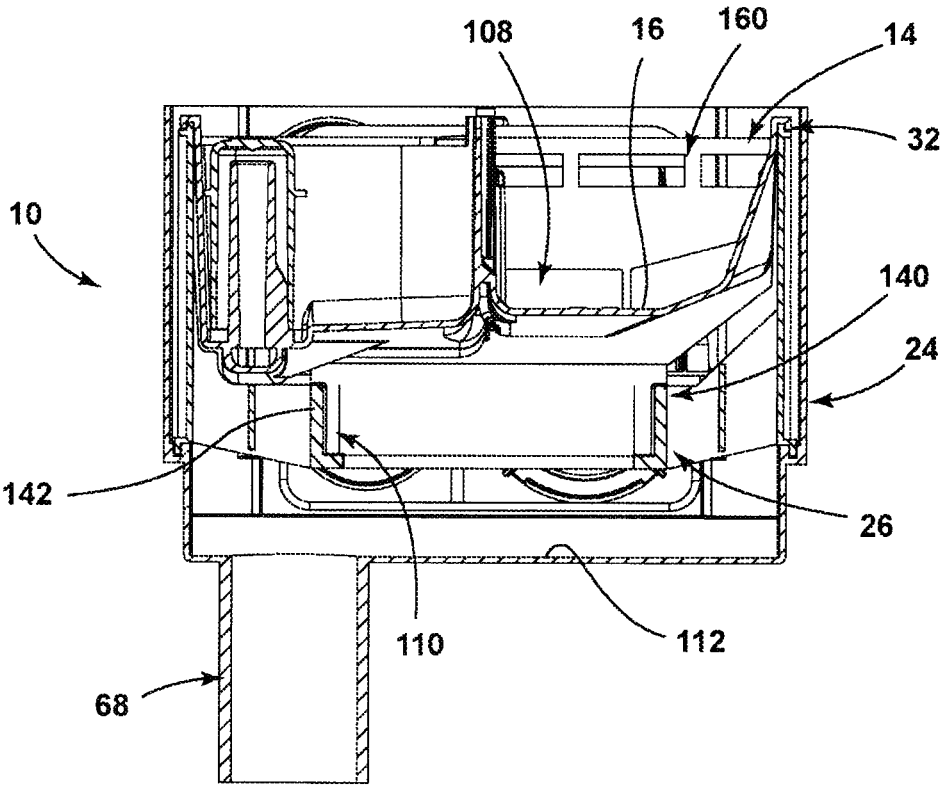
FIG. 13 is a cross-sectional view of the fluid treatment module of FIG. 5 taken along the line XIII-XIII.

The components in the figures are not necessarily to scale, emphasis instead being placed upon illustrating the principles described herein.

DETAILED DESCRIPTION

The present illustrated embodiments reside primarily in combinations of method steps and apparatus components related to a fluid treatment module that can be incorporated within an appliance for housing a microfiber filter with respect to a chemistry receptacle and, where the chemistry receptacle is selectively operable independent of the microfiber filter. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-17, reference numeral 10 generally designates a fluid treatment module that is installed in an appliance 12. The fluid treatment module 10 is adapted to include a chemistry receptacle 14 having various cavities or wells 16 for receiving treatment products 64 that can be used for cleaning various articles 18 within a processing space 20. According to the various aspects of the device, the fluid treatment module 10 can be disposed within any one of various appliances 12. These appliances 12 can include, but are not limited to, laundry washing appliances, laundry drying appliances, combination washing and drying appliances, dishwashers, and other similar appliances that are used for processing articles 18 within a processing space 20.

According to the various aspects of the device, as exemplified in FIGS. 1-17, the appliance 12 includes an outer cabinet 22 having a treatment interface 24 that is accessible via the outer cabinet 22. The treatment interface 24 is in communication with a processing space 20 defined within the outer cabinet 22. A microfiber receptacle 26 is selectively operable relative to the treatment interface 24, where the microfiber receptacle 26 is incorporated within the fluid treatment module 10. The microfiber receptacle 26 is operable relative to the treatment interface 24 of the outer cabinet 22 between an installed position 28 and an extracted position 30. The microfiber receptacle 26 also defines a sliding interface 32. A microfiber filter 34 is selectively removable from the microfiber receptacle 26 when the microfiber receptacle 26 is in the extracted position 30. The chemistry receptacle 14 is received by and can rest on the sliding interface 32 of the microfiber receptacle 26. The chemistry receptacle 14 is selectively operable along the sliding interface 32 between a fill position 36 that is at least partially outside the outer cabinet 22 and a treating position 38 that is within the treatment interface 24 and the outer cabinet 22. The chemistry receptacle 14 is operable between the fill position 36 and the treating position 38 when the microfiber receptacle 26 is in the installed position 28 within the outer cabinet 22 and the treatment interface 24. Operation of the microfiber receptacle 26 from the installed position 28 to the extracted position 30 typically moves both the microfiber receptacle 26 and the chemistry receptacle 14 relative to the outer cabinet 22.

Referring again to FIGS. 1-17, the appliance 12 includes a fluid delivery system 50 that is in communication with the treatment interface 24 and the processing space 20. The fluid delivery system 50 is in communication with the microfiber filter 34 when the microfiber filter 34 is in the installed position 28. The fluid delivery system 50 is also in communication with the chemistry receptacle 14 when the microfiber receptacle 26 is in the installed position 28 and the chemistry receptacle 14 is in the treating position 38.

As exemplified in FIGS. 1-13, the fluid delivery system 50 cooperates with the fluid treatment module 10 to process articles 18 within the appliance 12. During operation of the appliance 12, a carrier fluid 60, typically in the form of water, is delivered into the appliance 12 via a fluid inlet 52. A flow of the carrier fluid 60 is controlled at the treatment interface 24 by a fluid valve 62 that delivers the carrier fluid 60 into the treatment interface 24 and to the chemistry receptacle 14. The chemistry receptacle 14, as described herein, includes various wells 16 for receiving treatment products 64, such as detergent, oxi-materials, bleach, fabric softener, drying agents, combinations thereof and other similar treating products. The carrier fluid 60 is delivered into the chemistry receptacle 14 for mixing with the treatment products 64 for forming a treating fluid 66 that is delivered to the processing space 20. This treating fluid 66 is delivered from the chemistry receptacle 14 and through a delivery outlet 68 that is defined within an underside of the fluid treatment module 10. The treating fluid 66 is then delivered to the processing space 20, typically within a tub 70, where the articles 18 are processed. Where the appliance 12 is a laundry appliance 12, the processing space 20 may also includes a drum 72 that rotates within the tub 70.

After treatment of the articles 18 is complete within the processing space 20, the used treating fluid 78 is delivered into a sump 80 of the processing space 20. From the sump 80, this used treating fluid 78 is delivered via a pump 82 back to the fluid treatment module 10. A microfiber inlet 84 of the fluid treatment module 10 delivers the used treating fluid 78 into the microfiber receptacle 26 and through the microfiber filter 34 through a filter inlet 94. Within the microfiber filter 34, various microfibers and other particulate are separated from the used treating fluid 78 and captured within the microfiber filter 34. After the used treating fluid 78 is filtered to define filtered fluid 86, the filtered fluid 86 is delivered from the microfiber filter 34 through a filter outlet 96 of the fluid filter 34 and a module outlet 88 of the treatment interface 24. From this module outlet 88, the filtered fluid 86 is delivered to a drain 90 where the filtered fluid 86 is removed from the appliance 12. In certain aspects of the device, the treated fluid is delivered to a drain 90 that is attached to a removable bottle where the filtered fluid 86 can be removed from the appliance 12 and poured down a separate external drain 90.

Referring again to FIGS. 1-13, the fluid treatment module 10 includes a primary inlet 100 that delivers the carrier fluid 60 to the chemistry receptacle 14. The fluid treatment module 10 also includes the microfiber inlet 84 and a module outlet 88 that are each in communication with the microfiber receptacle 26 and the microfiber filter 34 disposed within the microfiber receptacle 26. Typically, the primary inlet 100, the microfiber inlet 84 and the module outlet 88 are incorporated into the treatment interface 24. The microfiber receptacle 26 and the chemistry receptacle 14 slidably operate with respect to the treatment interface 24. The treatment interface 24, the microfiber receptacle 26, and the chemistry receptacle 14 make up the fluid treatment module 10.

Referring now to FIGS. 3-15, the chemistry receptacle 14 includes a dispensing path 108 that assists in delivering the treating fluid 66 from the chemistry receptacle 14 and into the processing space 20. For delivering the treating fluid 66 into the processing space 20, the treating fluid 66 first passes from the chemistry receptacle 14, into the dispensing path 108 and through the microfiber receptacle 26. In this manner, the microfiber receptacle 26 includes the dispensing aperture 110 that aligns with a fluid channel 112 of the treatment interface 24. This alignment between the dispensing aperture 110 and the fluid channel 112 occurs when the microfiber receptacle 26 is in the installed position 28. Accordingly, during operation of the appliance 12, the carrier fluid 60 is mixed with the one or more treatment products 64 within the wells 16 of the chemistry receptacle 14 to form the treating fluid 66. This treating fluid 66 is dispensed from the chemistry receptacle 14 and through the dispensing path 108. The treating fluid 66 is then delivered through the dispensing aperture 110 of the microfiber receptacle 26 and into the fluid channel 112 of the treatment interface 24.

Additionally, the dispensing path 108 of the chemistry receptacle 14 aligns with the dispensing aperture 110 of the microfiber receptacle 26 and the fluid channel 112 when the chemistry receptacle 14 is in the treating position 38 relative to the microfiber receptacle 26. The fluid channel 112 then guides the treating fluid 66 through the delivery outlet 68 for delivery to the processing space 20. Additional amounts of carrier fluid 60 are typically delivered to assist with a complete dispensing of the treatment products 64 during operation of the appliance 12.

Referring again to FIGS. 3-13, the microfiber filter 34 is selectively attached to the fluid delivery system 50 when the microfiber receptacle 26 is in the installed position 28. In this installed position 28, the chemistry receptacle 14 can be selectively moved between the fill position 36 and the treating position 38 without disturbing the engagement between the microfiber filter 34 and the fluid delivery system 50 that occurs at the treatment interface 24. Periodically, it is necessary to remove or replace the microfiber filter 34 from the appliance 12. In these situations, the microfiber receptacle 26 can be removed from the treatment interface 24 using a filter grasping portion 120 that is positioned below a treatment grasping portion 122. Using the filter grasping portion 120, a user can extract the microfiber receptacle 26 from the treatment interface 24. In turn, this movement of the microfiber receptacle 26 also separates the microfiber filter 34 from the fluid delivery system 50 and from the treatment interface 24.

It is contemplated that certain fluid valves 62 are disposed within the primary inlet 100, the microfiber inlet 84 and module outlet 88 for preventing or eliminating the inadvertent flow or spillage of fluid within the fluid treatment module 10 or other portion of the appliance 12. In certain aspects of the device, installation of a microfiber filter 34 with the fluid delivery system 50 automatically moves these fluid valves 62 to an open position such that a flow of the carrier fluid 60, used treating fluid 78, and filtered fluid 86 can occur into and away from the treatment interface 24, the microfiber receptacle 26 and the chemistry receptacle 14 of the fluid treatment module 10. Also, the separation of the microfiber receptacle 26 and the microfiber filter 34 from the treatment interface 24 can operate to automatically move these fluid valves 62 to a closed position so that fluid cannot pass therethrough. The configuration of the fluid valves 62 and types of fluid valves 62 can vary based upon the design of the appliance 12.

Figure 14:
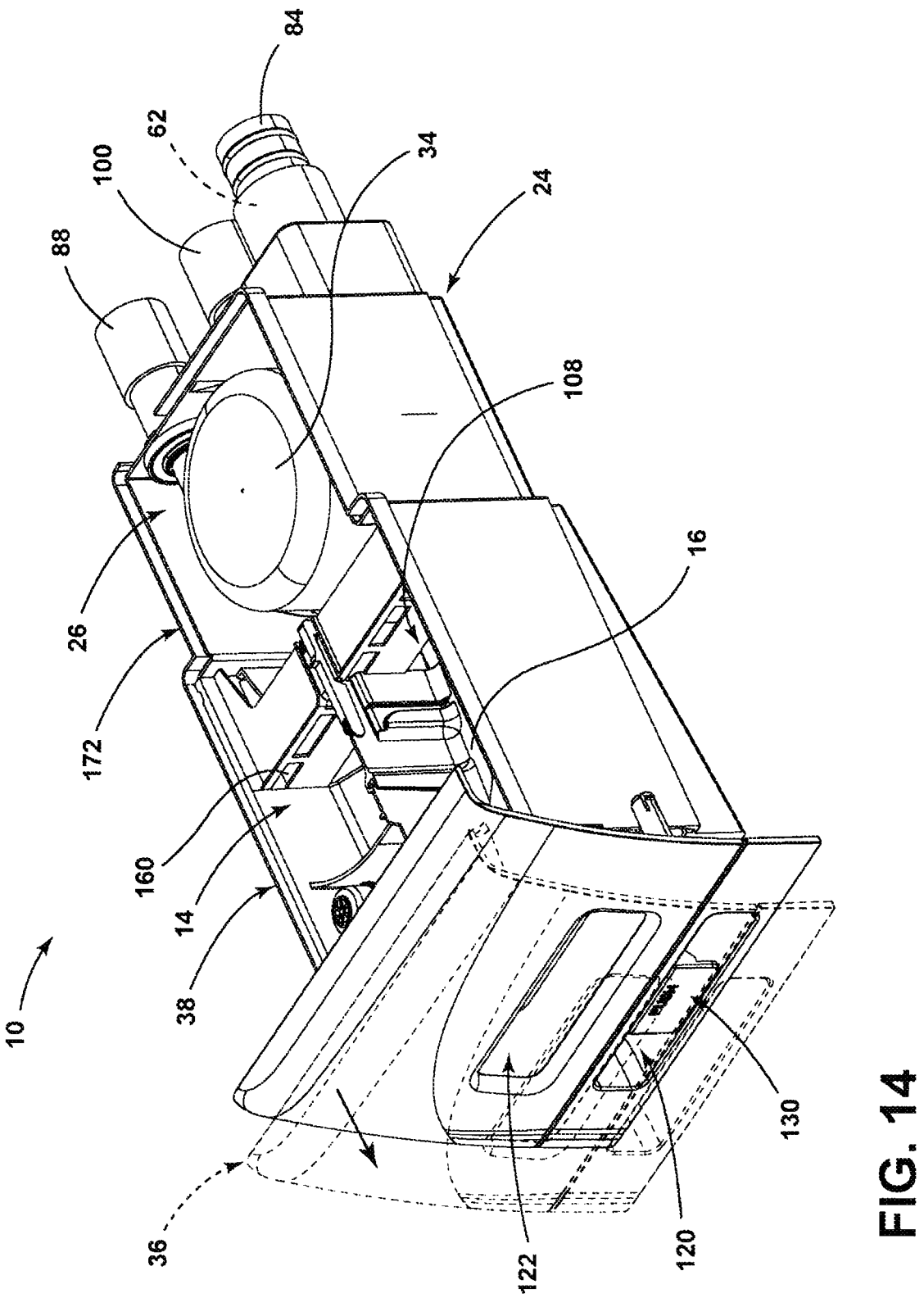
FIG. 14 is a perspective view of an aspect of the fluid treatment module that incorporates an actuating mechanism for separating the microfiber filter from the fluid delivery system.
Figure 15:
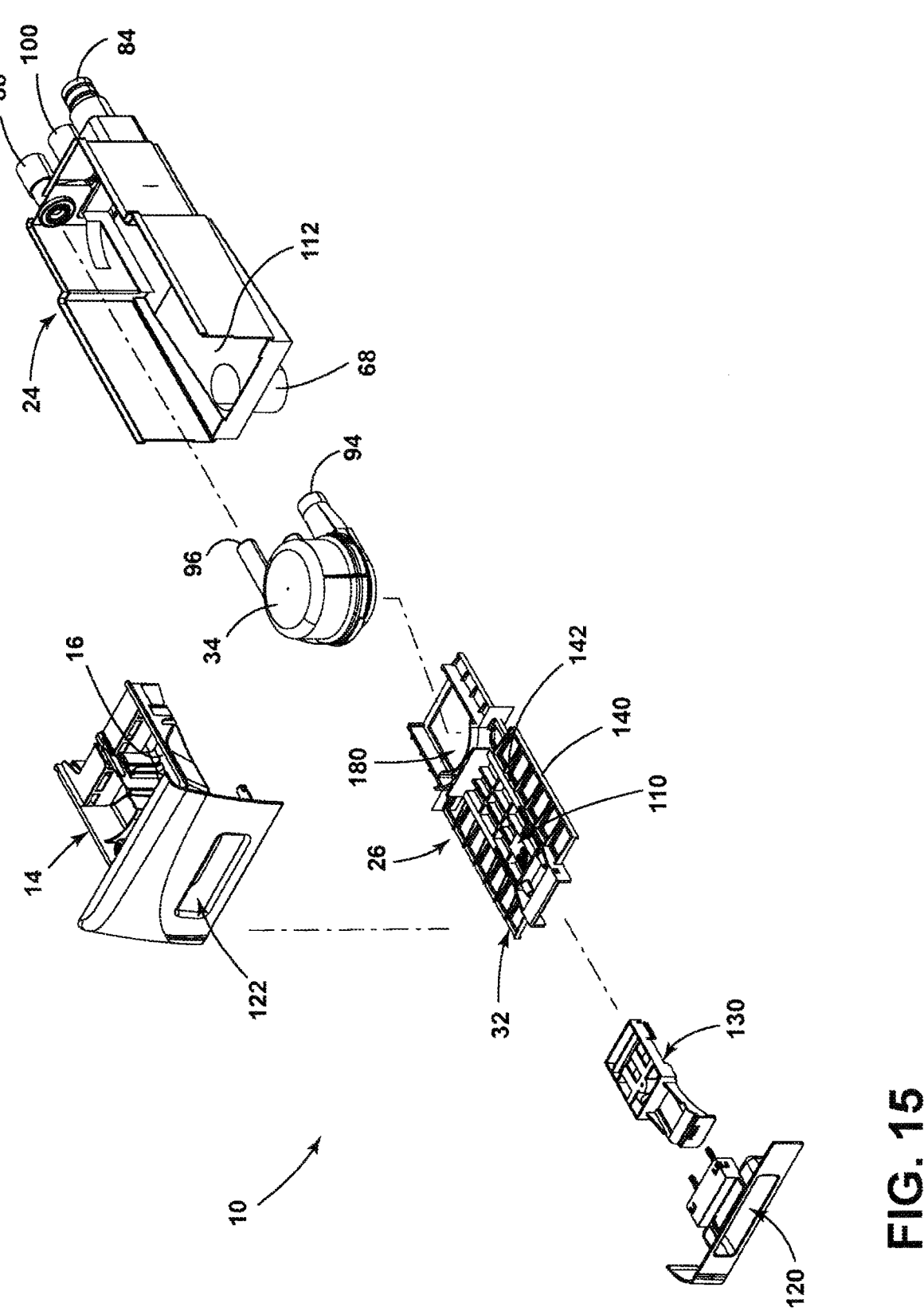
FIG. 15 is an exploded perspective view of the fluid treatment module of FIG. 14.

Referring now to FIGS. 14 and 15, the filter grasping portion 120 can include an actuating mechanism 130 that selectively separates the microfiber receptacle 26 from the installed position 28. In certain aspects of the device, the actuating mechanism 130 can loosen or fully separate the microfiber filter 34 from engagement with the treatment interface 24 and the fluid delivery system 50. Once separated, the fluid valves 62 described herein can move to the closed position to prevent the inadvertent flow of fluid that may lead to spillage. Additionally, once the microfiber filter 34 is separated from the fluid delivery system 50 at the treatment interface 24, the microfiber receptacle 26 can be separated from the treatment interface 24 and removed therefrom so that the microfiber filter 34 can be removed and/or replaced.

In certain aspects of the device, the actuating mechanism 130 can also disengage the microfiber receptacle 26 from the treatment interface 24. In such an aspect of the device, when the microfiber receptacle 26 is in the installed position 28, the microfiber receptacle 26 is secured and positioned within the treatment interface 24 through a locking mechanism. Engagement of the actuating mechanism 130 can serve to disengage this locking mechanism so that the microfiber receptacle 26 can be removed from the treatment interface 24. Such a locking mechanism can be used to prevent inadvertent removal of the microfiber receptacle 26 from the treatment interface 24.

Referring again to FIGS. 14 and 15, the actuating mechanism 130 can be in the form of a lever, latch, or other similar engaging mechanism. As exemplified in FIGS. 3-15, the actuating mechanism 130 can be in the form of a push-push release mechanism that can be used to selectively engage and disengage the microfiber receptacle 26 and the microfiber filter 34 from the treatment interface 24 and the fluid delivery system 50. It should be understood that various engagement mechanisms, locking mechanisms, and securing mechanisms can be used for securing the microfiber filter 34 and the microfiber receptacle 26 within the treatment interface 24 and in engagement with the fluid delivery system 50.

Referring again to FIGS. 3-13, the microfiber receptacle 26 includes the sliding interface 32 on which the chemistry receptacle 14 can slidably operate between the fill position 36 and the treating position 38. This sliding interface 32 is typically defined within a structural frame 140 of the microfiber receptacle 26. It is contemplated that the dispensing aperture 110 of the microfiber receptacle 26 is defined within the structural frame 140. In particular, the dispensing aperture 110 can be defined between support members 142 of the structural frame 140. In this manner, during operation of the appliance 12, the treating fluid 66 that is delivered from the chemistry receptacle 14 can be delivered through the structural frame 140 of the microfiber receptacle 26 and delivered to the fluid channel 112 of the treatment interface 24. Typically, this dispensing aperture 110 is larger than the opening of the dispensing path 108 of the chemistry receptacle 14. This difference in opening size assists in preventing splashing and accumulation of unused treating fluid 66 onto portions of the microfiber receptacle 26.

As exemplified in FIGS. 3-13, portions of the structural frame 140 of the microfiber receptacle 26 define the sliding interface 32 on which the chemistry receptacle 14 operates between the fill position 36 and the treating position 38. This sliding interface 32 can be in the form of rails, guides or glides of the microfiber receptacle 26, sliding surfaces of the microfiber receptacle 26, or other similar sliding features that can be defined within the microfiber receptacle 26.

Referring again to FIGS. 3-13, when the microfiber filter 34 is installed into the microfiber receptacle 26, the microfiber receptacle 26 is moved into the installed position 28. Once in the installed position 28, the microfiber filter 34 is engaged with the fluid delivery system 50. Where fluid valves 62 are utilized in the fluid delivery system 50, movement of the microfiber filter 34 in the installed position 28 serves to operate the fluid valves 62 to an open position. In this open position, carrier fluid 60 is able to be delivered through the primary inlet 100 and to the chemistry receptacle 14, used treating fluid 78 is able to be delivered into the microfiber filter 34 via the microfiber inlet 84, and filtered fluid 86 is able to be delivered from the microfiber filter 34 and through the module outlet 88.

In certain aspects of the device, the various fluid valves 62 can be operated using a controller 150. Where a controller 150 is utilized, the controller 150 can be coupled with various sensors that can monitor the position of the microfiber receptacle 26 relative to the treatment interface 24. When the microfiber receptacle 26 is moved away from the installed position 28, the various sensors can monitor this movement and deliver information to the controller 150. The controller 150, in turn, operates the fluid valves 62 to move from the open position to the closed position during an extraction of the microfiber filter 34 or to the open position during installation of the microfiber receptacle 26 into the treatment interface 24.

Referring again to FIGS. 8-13, carrier fluid 60 that is delivered to the treatment interface 24 and into the chemistry receptacle 14 can be moved around the microfiber filter 34 and into various carrier inlets 160 defined within the chemistry receptacle 14. Carrier fluid 60 moving through these carrier inlets 160 is then directed into the wells 16 of the chemistry receptacle 14 to be mixed with the various treatment products 64. Once mixed to form the treating fluid 66, the treating fluid 66 is then delivered through a dispensing path 108. It is contemplated that each well can include a dedicated dispensing path 108 that leads to the fluid channel 112. From the one or more dispensing paths 108, the treating fluid 66 is delivered through the dispensing aperture 110 and into the fluid channel 112 of the treatment interface 24. This movement of the carrier fluid 60 through the fluid treatment module 10 and around the microfiber filter 34 can be performed without interfering with the operation of the microfiber filter 34. Accordingly, the movement of the used treating fluid 78 from the processing space 20 and through the microfiber filter 34 is completely separated and water tight with respect to the movement of the carrier fluid 60 to the chemistry receptacle 14.

Through this system, the used treating chemistry can be delivered through the microfiber filter 34 such that all of the used treating fluid 78 being delivered away from the appliance 12 is first filtered through the microfiber filter 34. Additionally, placement of the microfiber filter 34 within the fluid treatment module 10 provides for an efficient and convenient location for removing and replacing the microfiber filter 34 with respect to the fluid delivery system 50.

Contemporaneously, the structures of the fluid treatment module 10 provides a system for maintaining the microfiber filter 34 in the installed position 28 during repeated operations of the chemistry receptacle 14 between the fill position 36 and the treating position 38 to fill the wells 16 with treatment products 64.

According to various aspects of the device, it is contemplated that the treatment interface 24 of the fluid treatment module 10 can include various operating mechanisms that prevent operation of the appliance 12 or when the microfiber filter 34 is absent or uninstalled, or installed improperly with respect to the microfiber receptacle 26. Various sensors can be installed within the microfiber filter 34 or portions of the fluid delivery system 50 for monitoring the efficiency of the microfiber filter 34. Where readings of these sensors are indicative of the microfiber filter 34 being filled to capacity with captured microfibers, the appliance 12 can deactivate the appliance 12 until such time as the microfiber filter 34 is replaced or cleaned. Placement of the microfiber receptacle 26 away from the installed position 28 and/or placement of the chemistry receptacle 14 away from the treating position 38 can also cause a deactivation of the appliance 12.

Referring now to FIGS. 1-17, the fluid treatment module 10 for the appliance 12 includes the treatment interface 24 that is configured to be in communication with the fluid delivery system 50. The fluid treatment module 10 includes the microfiber receptacle 26 that is selectively operable relative to the treatment interface 24 between the installed position 28 and the extracted position 30. As discussed herein, the microfiber receptacle 26 can include the sliding interface 32. The microfiber filter 34 is selectively removable from the microfiber receptacle 26 when the microfiber receptacle 26 is in the extracted position 30. The chemistry receptacle 14 is selectively received by the sliding interface 32. The chemistry receptacle 14 is selectively operable along the sliding interface 32 between the fill position 36 that is at least partially outside of the treatment interface 24 and a treating position 38 that is within the treatment interface 24. The actuating mechanism 130 is coupled to the microfiber receptacle 26 and selectively separates the microfiber receptacle 26 from the installed position 28.

In certain aspects of the device, the actuating mechanism 130 can operate to selectively separate the microfiber filter 34 from the treatment interface 24 and the fluid delivery system 50. It is contemplated that the chemistry receptacle 14 is operable between a fill position 36 and a treating position 38 when the microfiber receptacle 26 is secured in the installed position 28. Through this configuration, the chemistry receptacle 14 can be repeatedly accessed and moved between the fill position 36 and the treating position 38 without disturbing the position of the microfiber filter 34, with respect to the treatment interface 24 and the fluid delivery system 50. This configuration of the microfiber receptacle 26 and the chemistry receptacle 14 provides for a minimal amount of movement of the microfiber filter 34 with respect to the fluid delivery system 50.

According to various aspects of the device, the chemistry receptacle 14 in the treating position 38 is in communication with the processing space 20 via the fluid channel 112 and the delivery outlet 68 of the treatment interface 24. Additionally, when the microfiber filter 34 is in the installed position 28, the microfiber filter 34 is in communication with each of the processing space 20 and the outlet drain 90. Accordingly, in this position, and as described herein, the microfiber filter 34 operates to treat all of the fluid, or substantially all of the fluid, that is delivered from the processing space 20 and away from the appliance 12 via the drain 90. In certain aspects of the device, it is contemplated that certain amounts of the treating fluid 66 may be recycled within the appliance 12. This recycling of the treating fluid 66 can be delivered through a bypass line that bypasses the microfiber filter 34 and returns the treating fluid 66 to the processing space 20. When the used treating fluid 78 is to be delivered to the outlet drain 90, various valve mechanisms and/or diverters within the appliance 12 operate to deliver the used treating fluid 78 to the treatment interface 24 to be delivered through the microfiber filter 34 for separating microfibers from the used treating fluid 78.

Figure 14A:
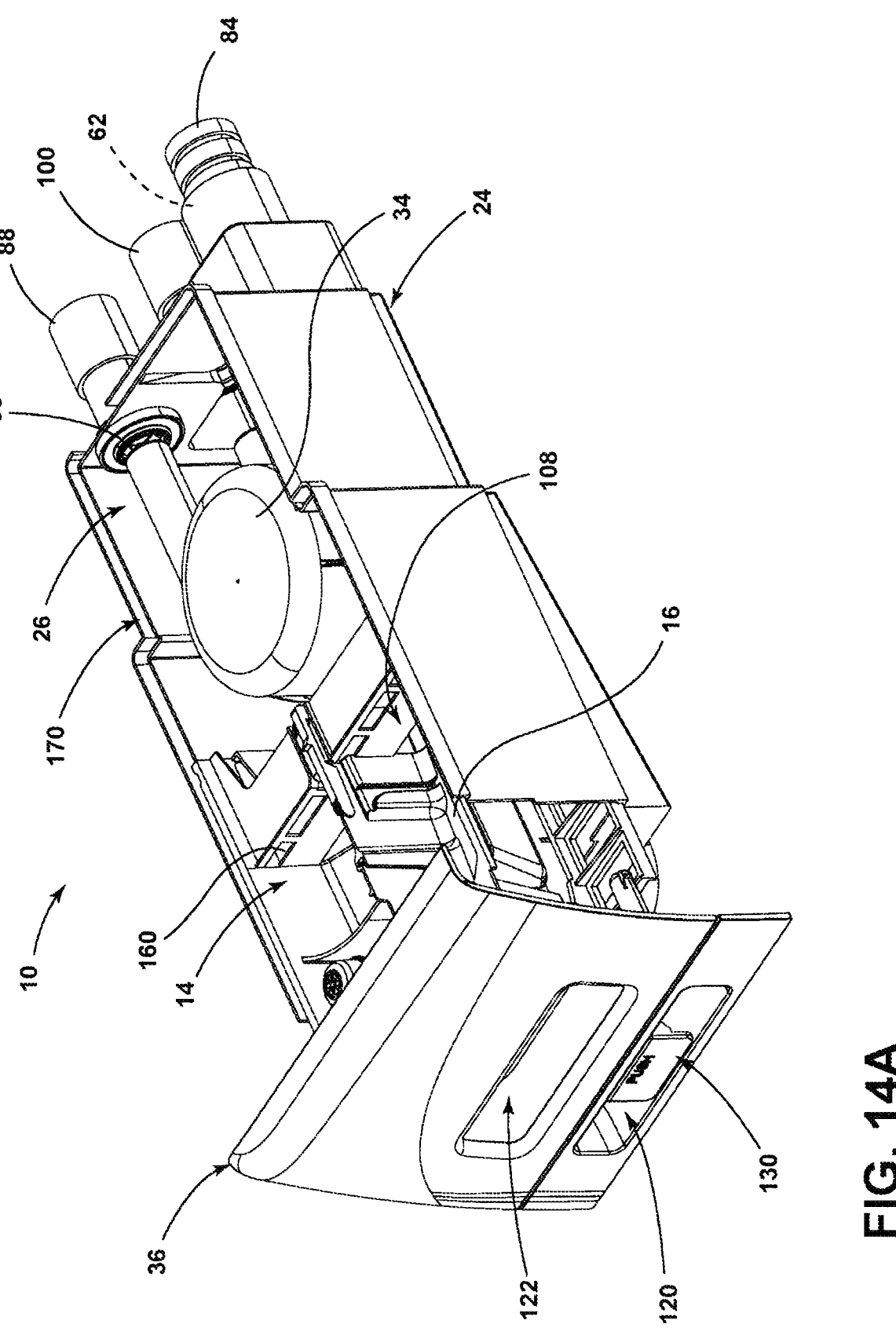
FIG. 14A is a perspective view of the fluid treatment module of FIG. 14 and showing the actuating mechanism in an attached state and the microfiber receptacle in an extracted position.

Referring again to FIGS. 14 and 15, the actuating mechanism 130 of the fluid treatment module 10 can operate to selectively engage the microfiber filter 34 and the microfiber receptacle 26 with the chemistry receptacle 14 to define an attached state 170, as exemplified in FIG. 14A. The microfiber receptacle 26 and the chemistry receptacle 14 are removable from the treatment interface 24 in the attached state 170. The chemistry receptacle 14 is operably independent of the microfiber filter 34 when the actuating mechanism 130 is in an idle state 172. Accordingly, until such time as the actuating mechanism 130 is engaged to define the attached state 170, the chemistry receptacle 14 is operable between the fill position 36 and the treating position 38 without disturbing the position of the microfiber receptacle 26 or the microfiber filter 34.

In certain aspects of the device, as exemplified in FIGS. 14-17, the chemistry receptacle 14 selectively receives the microfiber filter 34 in the attached state 170 of the actuating mechanism 130. In this attached state 170, the actuating mechanism 130 can operate to engage, grasp, attach with, or otherwise couple with a portion of the microfiber filter 34 or the filter receiver 180 that is disposed within the microfiber receptacle 26. In the attached state 170, the actuating mechanism 130 engages with the microfiber filter 34 to provide for an extraction of the microfiber filter 34 from the fluid delivery system 50. As described herein, the idle state 172 of the actuating mechanism 130 provides for a free and independent movement of the chemistry receptacle 14 relative to the microfiber filter 34.

Figure 16:
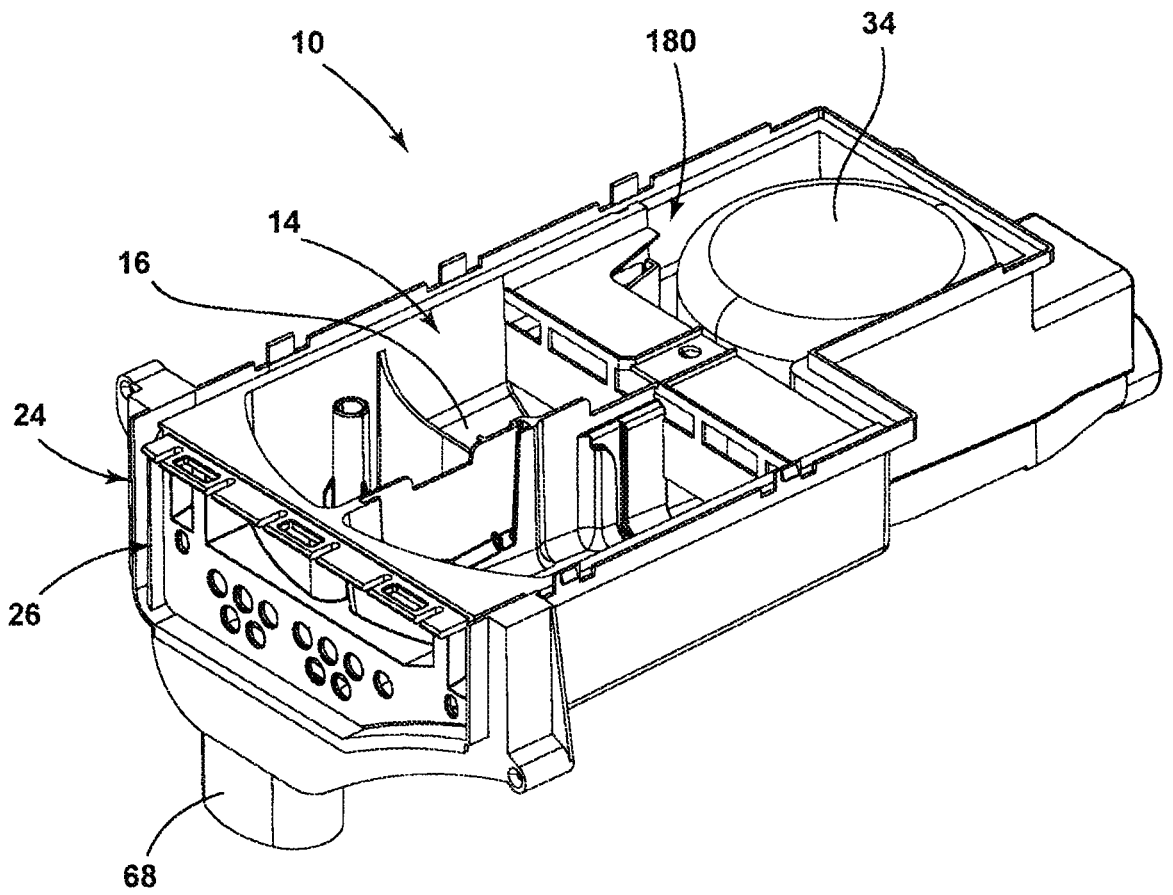
FIG. 16 is a perspective view of an aspect of the fluid treatment module with the microfiber receptacle selectively attached to the chemistry receptacle.
Figure 17:
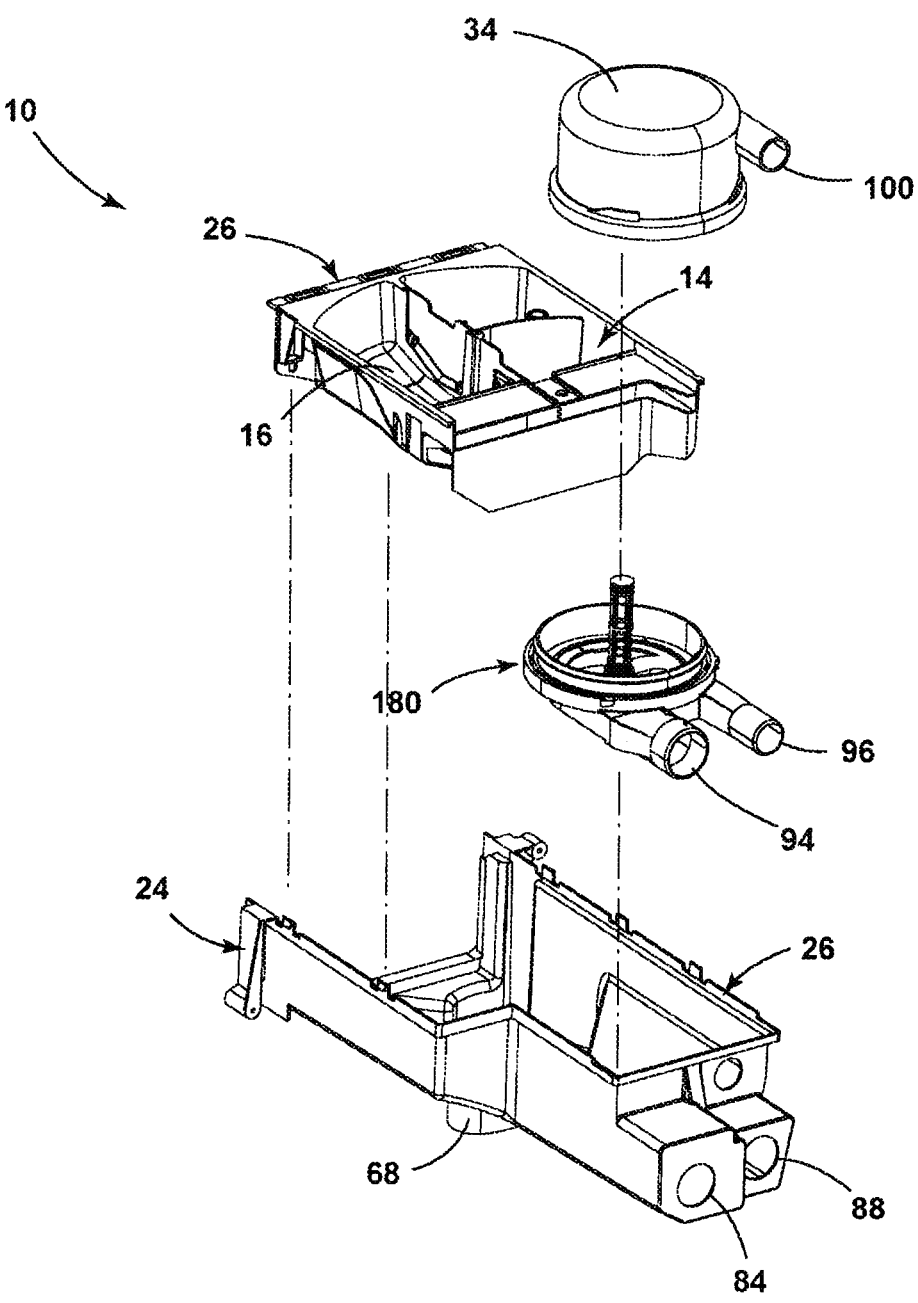
FIG. 17 is a partially exploded perspective view of the fluid treatment module of FIG. 16.

Referring now to FIGS. 16 and 17, it is contemplated that the microfiber filter 34 can be installed within a filter receiver 180 that is disposed within the treatment interface 24. An actuating mechanism 130 can be installed within the chemistry receptacle 14 for defining the attached state 170 of the actuating mechanism 130. When the actuating mechanism 130 is in the attached state 170, the chemistry receptacle 14 can couple with the filter receiver 180 and the microfiber filter 34 to move the microfiber filter 34 to the extracted position 30. When the actuating mechanism 130 is in the idle state 172, the chemistry receptacle 14 operates independent of the microfiber filter 34 and the filter receiver 180. Accordingly, the idle state 172 of the actuating mechanism 130 provides for movement of the chemistry receptacle 14 without disturbing the engagement of the microfiber filter 34 with the fluid delivery system 50.

In certain aspects of the device, the microfiber filter 34 can be attached directly to a single chemistry receptacle 14 that includes and incorporates a filter receiver 180. In such an aspect of the device, when a user can extract the chemistry receptacle 14 from the treatment interface 24, the user also extracts the microfiber filter 34 from the fluid delivery system 50. Each time the microfiber filter 34 is separated from the fluid delivery system 50, the fluid valve 62 of the treatment interface 24 operates between the open position and the closed position to prevent leakage of fluid into the treatment interface 24.

According to various aspects of the device, the fluid treatment module 10 that is installed within the appliance 12 provides for a convenient mechanism in which a user can access and replace a microfiber filter 34 for an appliance 12. Removal of microfibers from fluid used within the appliances 12 serves to prevent the microfibers from entering into the water supply or reentering the water supply. By capturing these microfibers from used treating fluid 78, the overall amount of microfibers that are within the water supply can be reduced over time. Additionally, because microfibers are prevalent within the use of clothing, placing the microfiber filter 34 within a laundry appliance provides a convenient and effective mechanism for capturing microfibers that may be removed from clothing. Various agitating mechanisms and processing mechanisms within the appliances 12 can be used for removing loose microfibers. The microfiber filter 34 can be used to capture these microfibers for removal and, typically, recycling.

The invention disclosed herein is further summarized in the following paragraphs and is further characterized by combinations of any and all of the various aspects described therein.

According to one aspect of the present disclosure, an appliance includes an outer cabinet that has a treatment interface that is in communication with a processing space defined within the outer cabinet. A microfiber receptacle is selectively operable relative to the treatment interface of the outer cabinet between an installed position and an extracted position. The microfiber receptacle defines a sliding interface. A microfiber filter is selectively removable from the microfiber receptacle in the extracted position. A chemistry receptacle is received by the sliding interface, and is selectively operable along the sliding interface between a fill position that is at least partially outside of the outer cabinet and a treating position that is within the treatment interface. The chemistry receptacle is operable between the fill position and the treating position when the microfiber receptacle is in the installed position.

According to another aspect, the appliance further includes a fluid delivery system that is in communication with the treatment interface. The fluid delivery system is in communication with the microfiber filter when the microfiber receptacle is in the installed position, and the fluid delivery system is in communication with the chemistry receptacle when the microfiber receptacle is in the installed position and the chemistry receptacle is in the treating position.

According to another aspect, the appliance further includes an actuating mechanism that selectively separates the microfiber receptacle from the installed position.

According to another aspect, the chemistry receptacle is independently operable relative to the microfiber receptacle.

According to another aspect, the microfiber receptacle includes a dispensing aperture that aligns with a fluid channel of the treatment interface when the microfiber receptacle is in the installed position.

According to another aspect, the chemistry receptacle includes a dispensing path that aligns with a dispensing aperture when the chemistry receptacle is in the treating position relative to the microfiber receptacle.

According to another aspect, the actuating mechanism is a push-push release that is defined between the microfiber receptacle and the treatment interface.

According to another aspect, the microfiber filter is attached to the fluid delivery system when the microfiber receptacle is in the installed position, and operation of the actuating mechanism at least partially separates the microfiber filter from the fluid delivery system.

According to another aspect, the appliance further includes a fluid valve. The fluid valve moves to a closed position when the microfiber receptacle and the microfiber filter are moved away from the installed position, and the fluid valve moves to an open position when the microfiber filter and the microfiber receptacle are moved into the installed position.

According to another aspect, the microfiber receptacle includes a structural frame, and a dispensing aperture is defined between support members of the structural frame.

According to another aspect, the fluid delivery system extends from a primary inlet to the chemistry receptacle, and the fluid delivery system extends from the microfiber filter to a drain. The microfiber filter is configured to capture microfibers from a treating fluid to define a filtered fluid that is delivered to an outlet drain.

According to another aspect of the present disclosure, a fluid delivery system for an appliance includes a chemistry receptacle that is selectively operable between a treating position within a treatment interface and a fill position that is at least partially removed from the treatment interface. The chemistry receptacle in the treating position is in communication with a processing space. A microfiber filter is selectively disposed within the treatment interface and is operable between an installed position and an extracted position. The microfiber filter in the installed position is in communication with a drain outlet. An actuating mechanism selectively engages the microfiber filter with the chemistry receptacle to define an attached state. The microfiber filter and the chemistry receptacle are removable from the treatment interface in the attached state. The chemistry receptacle is operable independent of the microfiber filter when the actuating mechanism is in an idle state.

According to another aspect, the chemistry receptacle includes a microfiber receptacle that selectively receives the microfiber filter in the attached state of the actuating mechanism.

According to another aspect, the fluid delivery system further includes a fluid valve that is in selective communication with the microfiber filter in an installed state. Operation of the actuating mechanism to define the attached state operates the fluid valve to a closed position, and movement of the microfiber filter into the installed position operates the fluid valve to an open position.

According to another aspect, the fluid delivery system further includes a microfiber receptacle that selectively receives the microfiber filter. The microfiber receptacle defines a sliding interface on which the chemistry receptacle rests. The chemistry receptacle is selectively operable along the sliding interface between the treating position and the fill position.

According to another aspect, the actuating mechanism is coupled with the microfiber receptacle.

According to yet another aspect of the present disclosure, a fluid treatment module for an appliance includes a treatment interface that is configured to be in communication with a fluid delivery system. A microfiber receptacle is selectively operable relative to the treatment interface between an installed position and an extracted position. The microfiber receptacle defines a sliding interface. A microfiber filter is selectively removable from the microfiber receptacle in the extracted position. A chemistry receptacle is received by the sliding interface, and is selectively operable between a fill position that is at least partially outside of the treatment interface and a treating position that is within the treatment interface. An actuating mechanism is coupled to the microfiber receptacle that selectively separates the microfiber receptacle from the installed position. The chemistry receptacle is operable between the fill position and the treating position when the microfiber receptacle is secured in the installed position.

According to another aspect, the microfiber receptacle includes a dispensing aperture that aligns with a fluid channel of the treatment interface when the microfiber receptacle is in the installed position. The chemistry receptacle includes a dispensing path that aligns with the dispensing aperture when the chemistry receptacle is in the treating position relative to the microfiber receptacle.

According to another aspect, the actuating mechanism is a push-push release that is defined between the microfiber receptacle and the treatment interface.

According to another aspect, the fluid treatment module further includes a fluid valve that is configured to be in communication with the fluid delivery system. The fluid valve moves to a closed position when the microfiber receptacle and the microfiber filter are moved away from the installed position, and the fluid valve is moved to an open position when the microfiber filter and the microfiber receptacle are moved into the installed position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance comprising:
an outer cabinet having a treatment interface that is in communication with a processing space defined within the outer cabinet;
a microfiber receptacle that is selectively operable relative to the treatment interface of the outer cabinet between an installed position and an extracted position, the microfiber receptacle defining a filter receiver and a sliding interface;
a microfiber filter that is selectively removable from the filter receiver of the microfiber receptacle in the extracted position; and
a chemistry receptacle that is received by and slidably operable within the sliding interface, the chemistry receptacle being selectively operable along the sliding interface between a fill position that is at least partially outside of the outer cabinet and a treating position that is within the treatment interface, wherein the chemistry receptacle is operable between the fill position and the treating position when the microfiber receptacle is in the installed position, and wherein the chemistry receptacle remains separated from the filter receiver and the microfiber receptacle in each of the fill position and the treating position.

2. The appliance of claim 1, further comprising:
a fluid delivery system in communication with the treatment interface, wherein
the fluid delivery system is in communication with the microfiber filter when the microfiber receptacle is in the installed position; and
the fluid delivery system is in communication with the chemistry receptacle when the microfiber receptacle is in the installed position and the chemistry receptacle is in the treating position.

3. The appliance of claim 2, further comprising an actuating mechanism that selectively separates the microfiber receptacle from the installed position, wherein the actuating mechanism is defined within the microfiber receptacle and is separate from the chemistry receptacle.

4. The appliance of claim 3, wherein the actuating mechanism is a push-push release that is defined between the microfiber receptacle and the treatment interface.

5. The appliance of claim 3, wherein the microfiber filter is attached to the fluid delivery system when the microfiber receptacle is in the installed position, and wherein operation of the actuating mechanism at least partially separates the microfiber filter from the fluid delivery system.

6. The appliance of claim 2, further comprising a fluid valve, wherein the fluid valve moves to a closed position when the microfiber receptacle and the microfiber filter are moved away from the installed position, and wherein the fluid valve moves to an open position when the microfiber filter and the microfiber receptacle are moved into the installed position.

7. The appliance of claim 2, wherein the fluid delivery system extends from a primary inlet to the chemistry receptacle, wherein the fluid delivery system extends from the microfiber filter to a drain, wherein the microfiber filter is configured to capture microfibers from a treating fluid to define a filtered fluid that is delivered to the drain, and wherein the filtered fluid remains separated from the chemistry receptacle.

8. The appliance of claim 1, wherein the chemistry receptacle is independently operable relative to the microfiber receptacle.

9. The appliance of claim 1, wherein the microfiber receptacle includes a dispensing aperture that aligns with a fluid channel of the treatment interface when the microfiber receptacle is in the installed position.

10. The appliance of claim 1, wherein the chemistry receptacle includes a dispensing path that aligns with a dispensing aperture when the chemistry receptacle is in the treating position relative to the microfiber receptacle.

11. The appliance of claim 1, wherein the microfiber receptacle includes a structural frame, and wherein a dispensing aperture is defined between support members of the structural frame.

12. A fluid delivery system for an appliance, the fluid delivery system comprising:
a chemistry receptacle that is selectively operable between a treating position within a treatment interface and a fill position that is at least partially removed from the treatment interface, wherein the chemistry receptacle in the treating position is in communication with a processing space;
a microfiber filter that is selectively disposed within the treatment interface and operable between an installed position and an extracted position, wherein the microfiber filter in the installed position is in communication with a drain;
an actuating mechanism that selectively engages the microfiber filter with the chemistry receptacle to define an attached state, wherein the microfiber filter and the chemistry receptacle are removable from the treatment interface in the attached state, and wherein the chemistry receptacle is operable independent of the microfiber filter when the actuating mechanism is in an idle state; and
a microfiber receptacle having a sliding interface that operably receives the chemistry receptacle and a filter receiver that receives the microfiber filter, wherein the microfiber filter is accessible via operation of the microfiber receptacle, wherein the chemistry receptacle remains separated from the filter receiver and the microfiber filter, and wherein the treatment interface slidably receives the microfiber receptacle in the installed position.

13. The fluid delivery system of claim 12, wherein the chemistry receptacle includes the microfiber receptacle that selectively receives the microfiber filter in the attached state of the actuating mechanism.

14. The fluid delivery system of claim 12, further comprising a fluid valve that is in selective communication with the microfiber filter in an installed position, wherein operation of the actuating mechanism to define the attached state operates the fluid valve to a closed position, and wherein movement of the microfiber filter into the installed position operates the fluid valve to an open position.

15. The fluid delivery system of claim 12, wherein the chemistry receptacle is selectively operable along the sliding interface between the treating position and the fill position.

16. The fluid delivery system of claim 15, wherein the actuating mechanism is coupled with the microfiber receptacle and is separate from the chemistry receptacle.

17. A fluid treatment module for an appliance, the fluid treatment module comprising:

a treatment interface that is configured to be in communication with a fluid delivery system;

a microfiber receptacle that is selectively operable relative to the treatment interface between an installed position and an extracted position, the microfiber receptacle defining a sliding interface;

a microfiber filter that is selectively removable from the microfiber receptacle in the extracted position;

a chemistry receptacle that is received by the sliding interface, the chemistry receptacle being selectively operable along the sliding interface between a fill position that is at least partially outside of the treatment interface and a treating position that is within the treatment interface; and an actuating mechanism coupled to the microfiber receptacle that selectively separates the microfiber receptacle from the installed position, wherein, the chemistry receptacle is operable between the fill position and the treating position when the microfiber receptacle is secured in the installed position, and wherein the chemistry receptacle is separated from the microfiber filter in each of the fill position and the treating position.

18. The fluid treatment module of claim 17, wherein the microfiber receptacle includes a dispensing aperture that aligns with a fluid channel of the treatment interface when the microfiber receptacle is in the installed position, and wherein the chemistry receptacle includes a dispensing path that aligns with the dispensing aperture when the chemistry receptacle is in the treating position relative to the microfiber receptacle.

19. The fluid treatment module of claim 17, wherein the actuating mechanism is a push-push release that is defined between the microfiber receptacle and the treatment interface.

20. The fluid treatment module of claim 17, further comprising a fluid valve that is configured to be in communication with the fluid delivery system, wherein the fluid valve moves to a closed position when the microfiber receptacle and the microfiber filter are moved away from the installed position, and wherein the fluid valve is moved to an open position when the microfiber filter and the microfiber receptacle are moved into the installed position.

* * * * *